(12) United States Patent
Kennedy

(10) Patent No.: US 9,212,654 B2
(45) Date of Patent: Dec. 15, 2015

(54) LOSSLESS SHORT-DURATION ELECTRICAL STORAGE MEANS FOR POWER GENERATION SYSTEM

(75) Inventor: Eugene J. Kennedy, Philadelphia, PA (US)

(73) Assignee: Kinetic Energy Corporation, Columbia, MD (US)

( * ) Notice: Subject to any disclaimer, the term of this patent is extended or adjusted under 35 U.S.C. 154(b) by 319 days.

(21) Appl. No.: 12/695,148

(22) Filed: Jan. 27, 2010
(Under 37 CFR 1.47)

(65) Prior Publication Data

US 2011/0089762 A1     Apr. 21, 2011

Related U.S. Application Data

(60) Provisional application No. 61/147,747, filed on Jan. 27, 2009, provisional application No. 61/147,748, filed on Jan. 27, 2009, provisional application No. 61/147,749, filed on Jan. 27, 2009, provisional application No. 61/147,750, filed on Jan. 27, 2009, provisional application No. 61/147,752, filed on Jan. 27, 2009, provisional application No. 61/147,754, filed on Jan. 27, 2009.

(51) Int. Cl.
*H02J 7/00* (2006.01)
*H02J 9/00* (2006.01)
*F03G 7/08* (2006.01)

(52) U.S. Cl.
CPC . *F03G 7/08* (2013.01); *Y10T 307/50* (2015.04)

(58) Field of Classification Search
USPC .................................................. 307/9.1, 66
See application file for complete search history.

(56) References Cited

U.S. PATENT DOCUMENTS

| 1,312,131 A | 8/1919 | Morton |
| 1,771,200 A | 7/1930 | Akers |
| 1,916,873 A | 7/1933 | Wiggins |

(Continued)

FOREIGN PATENT DOCUMENTS

| CH | 19861007504 A1 | 12/1986 |
| CN | 201045331 Y | 4/2008 |

(Continued)

OTHER PUBLICATIONS

Lee W. Young, International Search Report, PCT/US2009/066024, Apr. 2, 2010, p. 2, Alexandria, VA, US.

(Continued)

*Primary Examiner* — Rexford Barnie
*Assistant Examiner* — Dru Parries
(74) *Attorney, Agent, or Firm* — John J. Dresch; Dresch IP Law, PLLC

(57) ABSTRACT

A vehicle energy harvester including a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle from the first position to the second position and from the second position to the first position; and a capacitor coupled to the generator, the capacitor storing power generated by the generator.

25 Claims, 3 Drawing Sheets

(56) References Cited

U.S. PATENT DOCUMENTS

| | | |
|---|---|---|
| 3,748,443 A | 7/1973 | Kroll et al. |
| 3,859,589 A | 1/1975 | Rush |
| 3,885,163 A | 5/1975 | Toberman |
| 3,918,844 A | 11/1975 | Bailey |
| 3,944,855 A | 3/1976 | Le Van |
| 4,004,422 A | 1/1977 | Le Van |
| 4,081,224 A | 3/1978 | Krupp |
| 4,115,034 A | 9/1978 | Smith |
| 4,130,064 A | 12/1978 | Bridwell |
| 4,211,078 A | 7/1980 | Bass |
| 4,212,598 A | 7/1980 | Roche et al. |
| 4,228,360 A | 10/1980 | Navarro |
| 4,238,687 A | 12/1980 | Martinez |
| 4,239,974 A | 12/1980 | Swander et al. |
| 4,239,975 A | 12/1980 | Chiappetti |
| 4,247,785 A | 1/1981 | Apgar |
| 4,250,395 A | 2/1981 | Lundgren |
| 4,309,150 A | 1/1982 | Payne |
| 4,322,673 A | 3/1982 | Dukess |
| 4,339,920 A | 7/1982 | Le Van |
| 4,409,489 A | 10/1983 | Hayes |
| 4,418,542 A | 12/1983 | Ferrell |
| 4,434,374 A | 2/1984 | Lundgren |
| 4,437,015 A | 3/1984 | Rosenblum |
| 4,614,875 A | 9/1986 | McGee |
| 4,700,540 A | 10/1987 | Byrum |
| 4,739,179 A | 4/1988 | Stites |
| 4,912,995 A | 4/1990 | Otters |
| 4,915,196 A | 4/1990 | Krisko |
| 4,944,474 A | 7/1990 | Jones |
| 4,980,572 A | 12/1990 | Sen |
| 5,119,136 A | 6/1992 | Morikawa |
| 5,157,922 A | 10/1992 | Baruch |
| 5,250,769 A | 10/1993 | Moore |
| 5,347,186 A | 9/1994 | Konotchick |
| 5,355,674 A | 10/1994 | Rosenberg |
| 5,449,909 A | 9/1995 | Kaiser et al. |
| 5,634,774 A | 6/1997 | Angel et al. |
| 5,648,645 A | 7/1997 | Arpagaus et al. |
| 5,650,704 A * | 7/1997 | Pratt et al. .................. 318/623 |
| 5,678,933 A | 10/1997 | Ouchi et al. |
| 5,977,742 A | 11/1999 | Henmi |
| 5,984,432 A | 11/1999 | Otomo et al. |
| 6,023,134 A | 2/2000 | Carl et al. |
| 6,091,159 A | 7/2000 | Galich |
| 6,116,704 A | 9/2000 | Nakakita et al. |
| 6,172,426 B1 | 1/2001 | Galich |
| 6,204,568 B1 | 3/2001 | Runner |
| 6,353,270 B1 | 3/2002 | Sen |
| 6,362,534 B1 | 3/2002 | Kaufman |
| 6,376,925 B1 | 4/2002 | Galich |
| 6,467,266 B1 | 10/2002 | Kanazawa et al. |
| 6,494,144 B1 | 12/2002 | Perez Sanchez |
| 6,580,177 B1 | 6/2003 | Hagood et al. |
| 6,662,099 B2 | 12/2003 | Knaian et al. |
| 6,718,760 B1 | 4/2004 | Padera |
| 6,734,575 B2 | 5/2004 | Ricketts |
| 6,756,694 B2 | 6/2004 | Ricketts |
| 6,767,161 B1 * | 7/2004 | Calvo et al. .................. 404/71 |
| 6,812,588 B1 | 11/2004 | Zadig |
| 6,858,952 B2 | 2/2005 | Gott et al. |
| 6,894,233 B2 | 5/2005 | Dingwall et al. |
| 6,936,932 B2 | 8/2005 | Kenney |
| 6,969,213 B2 | 11/2005 | Rastegar et al. |
| 7,043,904 B2 | 5/2006 | Newman |
| 7,067,932 B1 | 6/2006 | Ghassemi |
| 7,102,244 B2 * | 9/2006 | Hunter, Jr. .................. 290/1 R |
| 7,145,257 B2 | 12/2006 | Ricketts |
| 7,148,581 B2 | 12/2006 | Hershey et al. |
| 7,239,031 B2 | 7/2007 | Ricketts |
| 7,315,088 B2 | 1/2008 | Erriu |
| 7,347,643 B2 | 3/2008 | Jeong |
| 7,371,030 B2 | 5/2008 | Hickman |
| 7,429,145 B2 | 9/2008 | Rastegar et al. |
| 7,541,684 B1 * | 6/2009 | Valentino .................. 290/1 R |
| 7,589,428 B2 | 9/2009 | Ghassemi |
| 7,629,698 B2 | 12/2009 | Horianopoulos et al. |
| 7,687,931 B2 | 3/2010 | Gasendo |
| 7,714,456 B1 | 5/2010 | Daya |
| 7,717,043 B2 | 5/2010 | Rastegar et al. |
| 2002/0014314 A1 * | 2/2002 | Miller .................. 160/23.1 |
| 2003/0132636 A1 | 7/2003 | Ricketts |
| 2003/0151381 A1 | 8/2003 | Kadota et al. |
| 2004/0066041 A1 | 4/2004 | Hunter, Jr. |
| 2005/0116545 A1 | 6/2005 | Hamel et al. |
| 2005/0143876 A1 | 6/2005 | Tanase |
| 2005/0200132 A1 | 9/2005 | Kenney |
| 2005/0268444 A1 | 12/2005 | Namerikawa et al. |
| 2006/0152008 A1 | 7/2006 | Ghassemi |
| 2006/0237968 A1 | 10/2006 | Chandrasekaran |
| 2007/0018803 A1 | 1/2007 | Lang |
| 2007/0020047 A1 | 1/2007 | Adair |
| 2007/0085342 A1 | 4/2007 | Horianopoulos et al. |
| 2007/0158945 A1 | 7/2007 | Annen et al. |
| 2007/0210652 A1 * | 9/2007 | Tracy et al. .................. 307/66 |
| 2007/0264081 A1 | 11/2007 | Chiu |
| 2008/0224477 A1 | 9/2008 | Kenney |
| 2009/0315334 A1 | 12/2009 | Chen |

FOREIGN PATENT DOCUMENTS

| | | |
|---|---|---|
| CN | 201050452 Y | 4/2008 |
| CN | 201396254 Y | 2/2010 |
| JP | 2000310102 A | 11/2000 |
| JP | 2002161848 A | 6/2002 |

OTHER PUBLICATIONS

Blaine R. Copenheaver, International Search Report, PCT/US2009/066025, Mar. 10, 2010, p. 2, Alexandria, VA, US.
Lee W. Young, International Search Report, PCT/US2010/022287, Jun. 1, 2010, p. 2, Alexandria, VA, US.
Blaine R. Copenheaver, International Search Report, PCT/US2010/022288, Jul. 12, 2010, p. 2, Alexandria, VA, US.
Lee W. Young, International Search Report, PCT/US2010/022289, Jun. 1, 2010, p. 2, Alexandria, VA, US.
Lee W. Young, International Search Report, PCT/US2010/022291, Jun. 15, 2010, p. 2, Alexandria, VA, US.
Blaine R. Copenheaver, International Search Report, PCT/US2010/022294, Jun. 28, 2010, p. 2, Alexandria, VA, US.
Blaine R. Copenheaver, International Search Report, PCT/US2010/022296, Jul. 29, 2010, p. 2, Alexandria, VA, US.
Lee W. Young, International Search Report, PCT/US2010/020676, Jun. 15, 2010, p. 2, Alexandria, VA, US.
National Search Report CN2010800146126 dated Aug. 6, 2013.
National Search Report CN2010800146145 dated Jul. 26, 2013.
National Search Report CN2009801552247 dated Mar. 19, 2013.

* cited by examiner

LOSSLESS SHORT-DURATION ELECTRICAL STORAGE MEANS FOR POWER GENERATION SYSTEM

CROSS-REFERENCE TO RELATED APPLICATIONS

The present invention claims the benefit of U.S. Provisional Patent Application No. 61/147,747, filed Jan. 27, 2009, and entitled "TRANSIENT ABSORBER FOR POWER GENERATION SYSTEM", U.S. Provisional Patent Application No. 61/147,748, filed Jan. 27, 2009, and entitled "WEATHER RESPONSIVE TREADLE LOCKING MEANS FOR POWER GENERATION SYSTEM", U.S. Provisional Patent Application No. 61/147,749, filed Jan. 27, 2009, and entitled "LOW PROFILE, SURFACE-MOUNTED POWER GENERATION SYSTEM", U.S. Provisional Patent Application No. 61/147,750, filed Jan. 27, 2009, and entitled "VEHICLE SPEED DETECTION MEANS FOR POWER GENERATION SYSTEM", U.S. Provisional Patent Application No. 61/147,752, filed Jan. 27, 2009, and entitled "RECIPROCAL SPRING ARRANGEMENT FOR POWER GENERATION SYSTEM", and U.S. Provisional Patent Application No. 61/147,754, filed Jan. 27, 2009, and entitled "LOSSLESS SHORT-DURATION ELECTRICAL STORAGE MEANS FOR POWER GENERATION SYSTEM", the entire contents of which are incorporated herein by reference in their entirety.

FIELD OF THE INVENTION

The present invention is directed toward devices and methods of harvesting vehicle energy, and more specifically, toward a power generation system for harvesting vehicle energy having a substantially lossless short-duration electrical storage means.

BACKGROUND OF THE INVENTION

Very few devices that capture energy from passing vehicles have been implemented, despite numerous designs put forth by various parties over the years. Issues of efficiency, reliability, and manufacturability, among others, have limited the practicality of vehicle energy harvesting devices. Added to the challenge is the variability of vehicle sizes, speeds, axle configurations, and lane positions, all of which can greatly influence the operation of a device trying to capture the motion energy of vehicles and convert it into a useful form of energy.

Therefore, a need exists for an energy capture device and method having improved efficiency, reliability, and manufacturability, as well as practicality. A need also exists for an energy capture device and method that takes into account the variability of vehicle sizes, speeds, axle configurations, and lane positions in converting the captured motion energy of vehicles into a useful form of energy.

SUMMARY OF THE INVENTION

These problems and others are addressed by the present invention, which provides a novel vehicle energy harvester that overcomes many of the issues with the conventional devices and is therefore better suited for real-world implementation than the conventional devices.

The exemplary embodiments of the invention make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators.

The disclosed embodiments provide a vehicle energy harvester and power generation system that is simple to install, provides a short payback period, and has a scalable configuration. More particularly, the disclosed embodiments can provide a simple and reliable mechanical configuration that can withstand severe environments. The low cost configuration of the system may provide for faster payback of the expense of the system, and therefore, make the system more practical and desirable for practical applications.

Additionally, the ease with which the system can be installed also may make the system more practical and desirable for practical applications. The disclosed embodiments require little or no excavation and can be installed in a few hours, instead of over several days as with conventional devices.

The disclosed embodiment also can provide a scalable configuration that may be particularly advantageous for use at locations, such as exits ramps, toll plazas, hills, among other locations.

An embodiment also can include monitoring the status or operation of the unit, either periodically or 24 hours per day, seven days per week, using for example, a wireless link or other wired or wireless communication device.

The exemplary embodiments improve the durability of the system under practical use scenarios. The embodiments of the invention are capable of withstanding the stresses placed upon the system during normal use.

The exemplary embodiments also can improve the conversion efficiency and reduce the maintenance and operating costs of the system by providing a substantially lossless short-duration electrical storage means.

An exemplary embodiment of the invention is directed to, for example, a vehicle energy harvester comprising a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle from the first position to the second position and from the second position to the first position; and a capacitor coupled to the generator, the capacitor storing power generated by the generator.

Another exemplary embodiment of the invention is directed to, for example, a vehicle energy harvester comprising a plurality of subunits each having an upper surface forming a roadway surface; a plurality of vehicle activated treadles on the plurality of subunits, each of the plurality of vehicle activated treadles moveable between a first position in which an upper surface of the treadle is at an angle with respect to the upper surface of the roadway surface and a second position in which the upper surface of the treadle is flush with the upper surface of the roadway surface; and a plurality of generators that generate power in response to movement of each of the plurality of vehicle activated treadles, and a plurality of capacitors coupled to the plurality of generators, the plurality of capacitors storing power generated by the plurality of generators.

Another exemplary embodiment of the invention is directed to, for example, a vehicle energy harvester comprising a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle from the first position to the second position and from the second position to the first position; and short-duration electrical storage means, coupled to the generator, for storing power generated by the generator.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1:
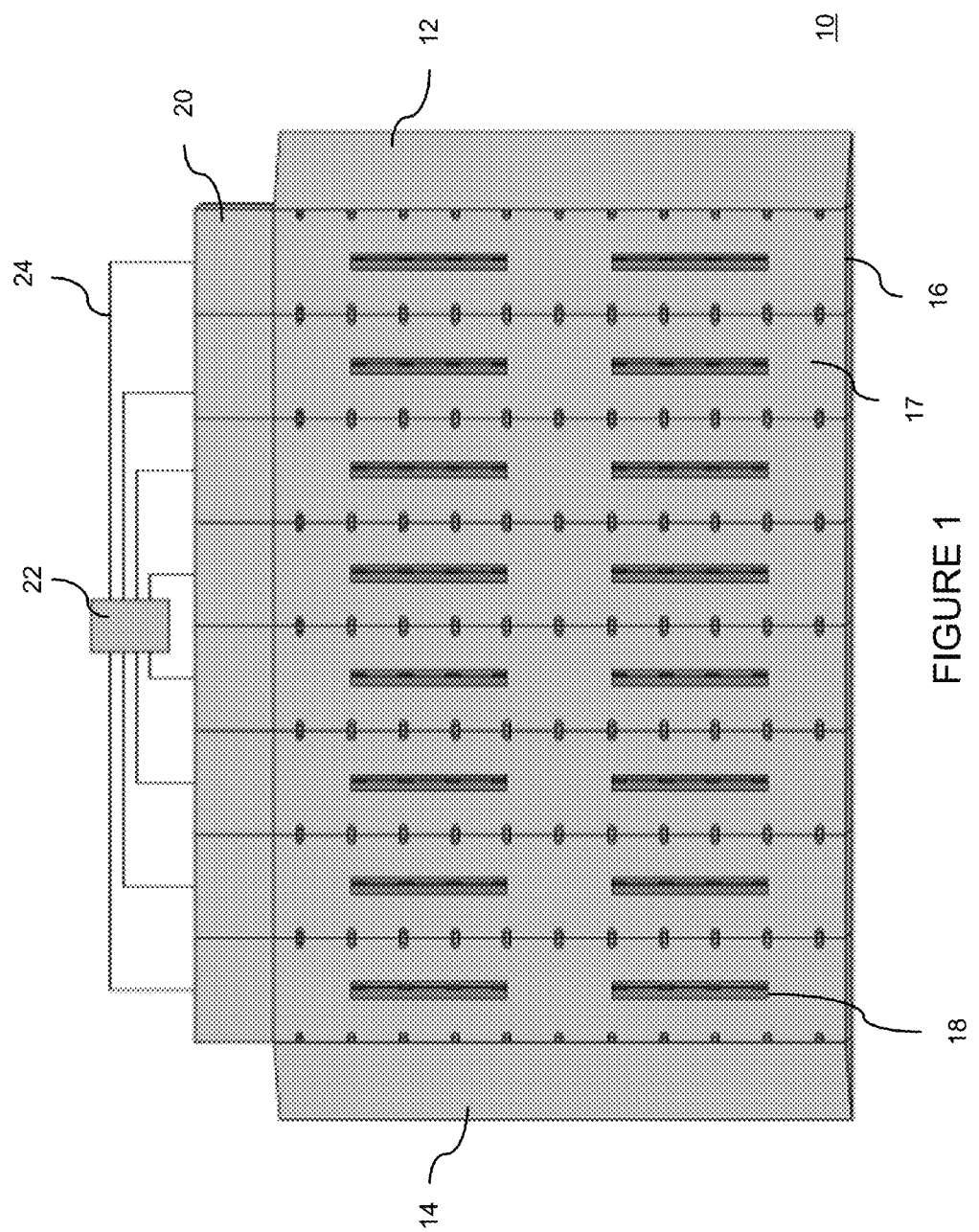
FIG. 1 is a schematic top view of a power absorber unit of an exemplary vehicle energy harvester.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-4 illustrate exemplary embodiments of a vehicle energy harvester.

The exemplary embodiments can make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators. Other means for converting the mechanical energy to electrical energy also are contemplated. In an exemplary embodiment, the electric power from the generators can be converted, metered, and fed into the commercial power grid. In another exemplary embodiment, each site can be equipped with wireless communications to monitor the status and/or output of the system.

Power Absorber Configuration

The disclosed embodiments can include individual assemblies with integral generators. Other generator configurations also are possible, such as separate generators.

As shown in FIG. 1, the vehicle energy harvester unit 10 can be a low-profile surface mounted assembly. The vehicle energy harvester unit 10 can include an entry ramp 12 and an exit ramp 14. The vehicle energy harvester unit 10 can include a plurality of subunits 16 having a top surface or driving surface 17. Each subunit can include one or more vehicle activated treadles 18. In an embodiment, each subunit 16 can include a generator unit 20.

In other embodiments, the vehicle energy harvester unit 10 can be set into the road surface. The surface mounted assembly may require minimal installation effort. Additionally, the unit count can be scaled to road/breaking needs. In an embodiment, each generator unit 20 can feed a common power summing/conversion unit 22. A simple cable interconnect 24 can be provided to connect each generator unit 20 to the common power summing/conversion unit 22. A fail safe configuration can protect the system against individual unit failures.

Power Conversion Unit

In a disclosed embodiment, the individual absorber units 16 can be connected via cable assemblies 24. The input power can be summed and applied to a low-loss inverter unit. The power can be converted immediately to a form that is transmittable to the power grid. The output can be metered and applied to the power grid for transmission.

Absorber Unit Operation

Figure 2:
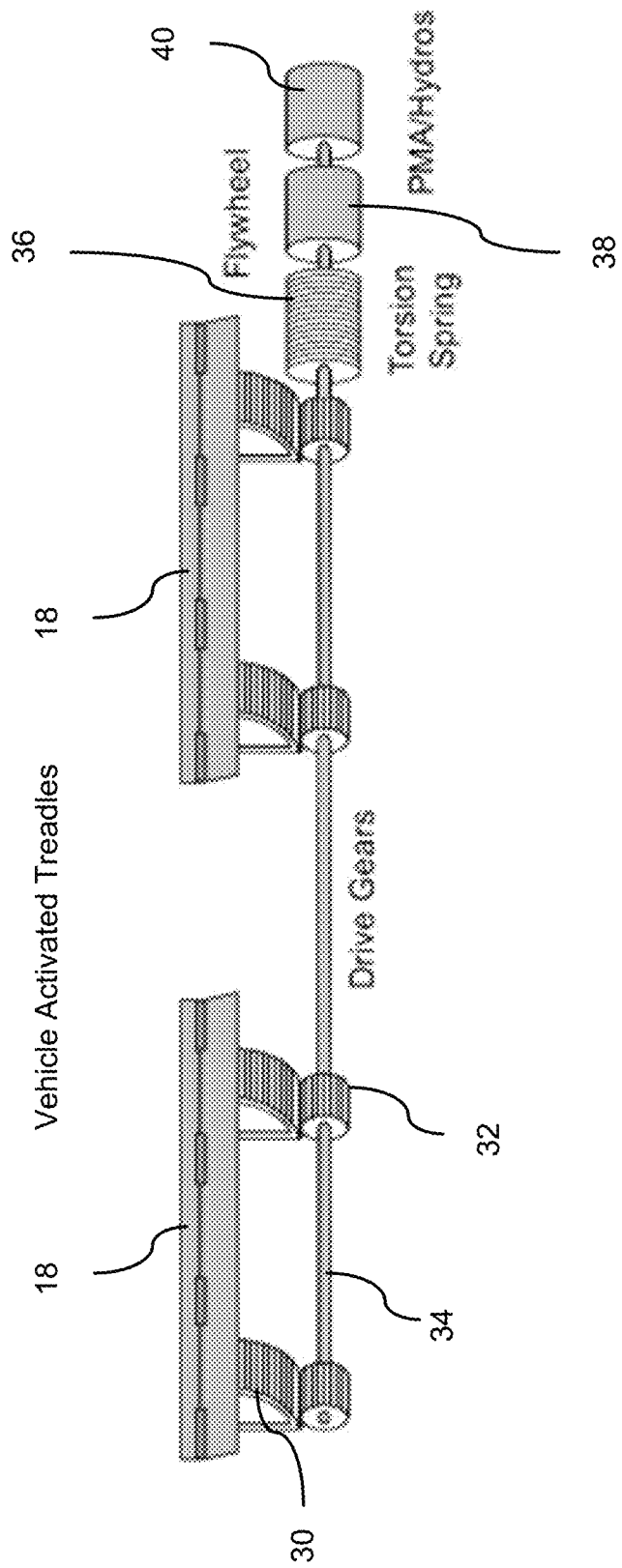
FIG. 2 is a schematic perspective view illustrating a portion of an exemplary vehicle energy harvester.

With reference to FIG. 2, an exemplary embodiment of a subunit 16 of a vehicle energy harvester unit 10 can include spring-loaded treadles 18 having a treadles gear 30 engaging a drive gear 32. The drive gear 32 is coupled to a shaft 34. In operation, one or more vehicle tires force the spring-loaded treadles 18 down as they roll over the treadles 18. The treadle gears 30 drive the plurality of drive gears 32, which rotate the shaft 34. The shaft 34 winds a torsion spring 36, thereby absorbing the treadle drive transient. A pawl can lock the shaft 34 as rotation ends. The torsion spring 36 rotates a flywheel 38, thereby spreading the impulse of the treadle drive over time to extend output to a generator 40. The flywheel 38 can turn a generator 40, such as a hydro pump. The generator 40, in turn, can generate electric power for sale/use/storage.

Lossless Short-Duration Electrical Storage Means

Figure 3:
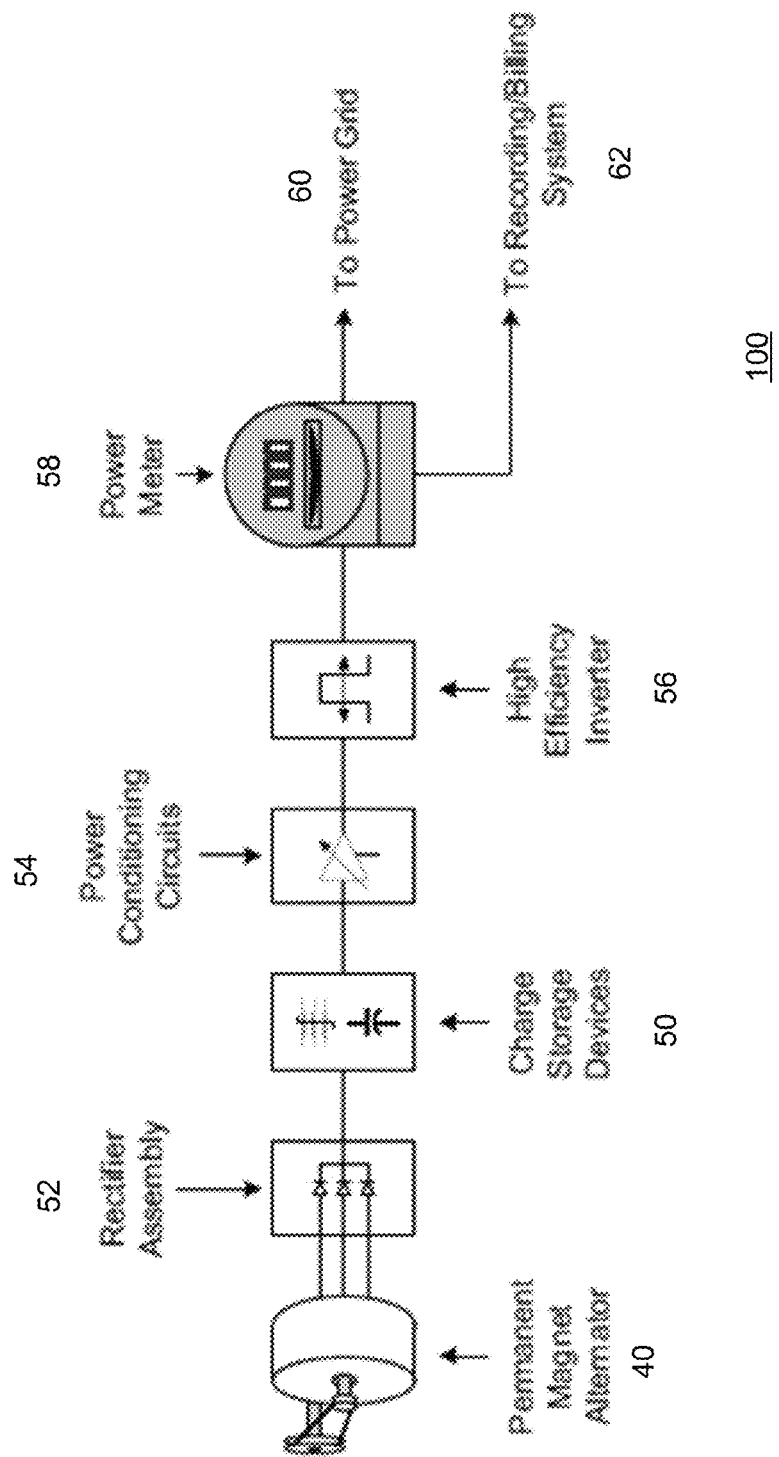
FIG. 3 is a schematic illustrating a low-loss power conversion system of an exemplary vehicle energy harvester.

With reference to FIG. 3, exemplary embodiments for providing improved short-duration electrical storage of the power generated by the vehicle energy harvester unit 10 will now be described.

Commonly, many electrical conversion devices available use batteries as a storage means for storing the electric power generated by an energy harvester. Since the exemplary embodiments of the vehicle energy harvester unit 10 are highly modular and each treadle subunit 16 creates a relatively small amount of electric power during individual impacts, high capacity capacitors (e.g., 50) can be implemented as a storage device, as exemplarily shown in FIG. 4. Such capacitors (e.g., 50) can provide important benefits of being nearly lossless (e.g., lossless or substantially lossless). Additionally, the frequency with which such capacitors (e.g., 50) may need to be replaced during the life of the system can be minimized or eliminated all together. In contrast, conventional systems using batteries may need to be replaced periodically throughout the life of the system, resulting in increased maintenance and operational costs.

In an exemplary embodiment, each treadle subunit 16 can create and store an electric charge each time a vehicle passes over the system and activates the treadle 18. This charge can be stored in a suitably sized capacitor (e.g., 50). The capacitor (e.g., 50) can be connected via a simple cable assembly to a central harvesting unit, which receives and combines the output with the outputs from other treadle assemblies (e.g., subunits 16).

FIG. 3 schematically illustrates an exemplary low-loss power conversion system 100. With reference to FIGS. 1-3, the operation of the exemplary low-loss power conversion system will now be described.

In operation, the weight of an oncoming vehicle(s) forces the treadle 17 downward. The system converts the downward movement of the treadle 17 to a rotational force at the permanent magnet alternator (PMA) 40. The PMA 40 converts the mechanical force to electric power. The output of the PMA 40 can be rectified by a rectifier assembly 52 and used to charge an electrical storage device or devices 50, such as one or more high capacity capacitors. A micro-controller unit (MCU) (not shown) can be provided to control power conditioning circuits 54 to provide constant output to an inverter unit 56, such as a high efficiency inverter. The inverter unit 56 can convert the input power to AC power in the proper form, for example, for resale to a local utility company (e.g., 60). The output power can be metered (e.g., 58) for billing and administrative uses, etc. (e.g., 62).

By providing a substantially lossless short-duration electrical storage means (e.g., 50), the exemplary embodiments provide important advantages of improving the conversion efficiency of the system as well as reducing the maintenance and operating costs of the system, among other things.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

What is claimed is:

1. A vehicle energy harvester comprising:
    a subunit having an upper surface forming a roadway surface;
    a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
    a generator that generates power in response to movement of the vehicle activated treadle from the first position to the second position and from the second position to the first position;
    a capacitor coupled to the generator, the capacitor storing power generated by the generator;
    a transient absorption device coupled between a gear and the generator, the transient absorption device configured to absorb a transient force acting on the vehicle activated treadle;
    a flywheel coupled between the transient absorption device and the generator; and
    a shaft,
    wherein the gear and transient absorption device are on the shaft,
    wherein the vehicle activated treadle includes a treadle gear engaging the gear on the shaft, and
    wherein the transient absorption device is a torsion spring coupled to the shaft between the gear and the flywheel, and configured to absorb the transient force acting on the vehicle activated treadle.

2. The vehicle energy harvester of claim 1, wherein the capacitor is a high capacity capacitor.

3. The vehicle energy harvester of claim 1, comprising:
    a central harvesting unit coupled to the capacitor.

4. The vehicle energy harvester of claim 3, wherein the central harvesting unit is coupled to the capacitor via a cable assembly.

5. The vehicle energy harvester of claim 3, wherein the central harvesting unit is coupled to a second capacitor, and wherein the central harvesting unit combines the output with the capacitor and the second capacitor.

6. The vehicle energy harvester of claim 1, wherein the generator is a permanent magnet alternator (PMA).

7. The vehicle energy harvester of claim 1, comprising:
    a rectifier assembly coupled between the generator and the capacitor.

8. The vehicle energy harvester of claim 7, comprising:
    a power conditioning circuit coupled to an output of the capacitor.

9. The vehicle energy harvester of claim 8, comprising:
    an inverter unit coupled to an output of the power conditioning circuit.

10. The vehicle energy harvester of claim 9, comprising:
a power meter coupled to an output of the inverter unit.

11. The vehicle energy harvester of claim 1, wherein the gear includes at least a drive gear or a treadle gear, and the gear is being driven by movement of the treadle.

12. The vehicle energy harvester of claim 1, wherein the transient absorption device is a torsion spring configured to absorb the transient force acting on the vehicle activated treadle.

13. The vehicle energy harvester of claim 1, further comprising a shaft,
wherein the gear and transient absorption device are on the shaft, and
wherein the vehicle activated treadle includes a treadle gear engaging the gear on the shaft.

14. The vehicle energy harvester of claim 1, wherein the vehicle activated treadle includes a second gear moveable between a first rotational gear position when the vehicle activated treadle is in the first position in which the upper surface of the treadle is at the angle with respect to the upper surface of the roadway surface and a second rotational gear position when the vehicle activated treadle is in the second position in which the upper surface of the treadle is flush with the upper surface of the roadway surface,
wherein the second gear engages the gear on the shaft and turns the gear on the shaft in a first rotational direction during movement of the vehicle activated treadle from the first position to the second position and in a second, opposite rotational direction during movement of the vehicle activated treadle from the second position to the first position, and
wherein the torsion spring is configured to absorb the transient force acting on the vehicle activated treadle during movement of the vehicle activated treadle from the first position to the second position and from the second position to the first position.

15. A vehicle energy harvester comprising:
a plurality of subunits each having an upper surface forming a roadway surface;
a plurality of vehicle activated treadles on the plurality of subunits, each of the plurality of vehicle activated treadles moveable between a first position in which an upper surface of the treadle is at an angle with respect to the upper surface of the roadway surface and a second position in which the upper surface of the treadle is flush with the upper surface of the roadway surface;
a plurality of generators that generate power in response to movement of each of the plurality of vehicle activated treadles;
a plurality of capacitors coupled to the plurality of generators, the plurality of capacitors storing power generated by the plurality of generators;
a plurality of transient absorption devices coupled between a plurality of gears and the plurality of generators, the plurality of transient absorption devices configured to absorb transient forces acting on the plurality of vehicle activated treadles; and
a plurality of flywheels coupled between the plurality of transient absorption devices and the plurality of generators; and
a plurality of shafts,
wherein each of the plurality of gears and the plurality of transient absorption devices is on a respective shaft of the plurality of shafts,
wherein each of the plurality of the vehicle activated treadles includes a treadle gear engaging a respective gear of the plurality of gears on the respective shaft, and
wherein each of the plurality of the transient absorption devices is a torsion spring coupled to the respective shaft between the respective gear and a respective flywheel of the plurality of flywheels, and configured to absorb the transient force acting on a respective treadle of the plurality of vehicle activated treadles.

16. The vehicle energy harvester of claim 15, comprising:
a central harvesting unit coupled to the plurality of capacitors.

17. The vehicle energy harvester of claim 16, wherein the central harvesting unit is coupled to each of the plurality of capacitors via a cable assembly.

18. The vehicle energy harvester of claim 16, wherein the central harvesting unit combines the output with the plurality of capacitors.

19. The vehicle energy harvester of claim 15, comprising:
a rectifier assembly coupled between each of the plurality of generators and the plurality of capacitors.

20. The vehicle energy harvester of claim 19, comprising:
a power conditioning circuit coupled to an output of the plurality of capacitors.

21. The vehicle energy harvester of claim 20, comprising:
an inverter unit coupled to an output of the power conditioning circuit.

22. The vehicle energy harvester of claim 21, comprising:
a power meter coupled to an output of the inverter unit.

23. The vehicle energy harvester of claim 15, wherein the plurality of gears include at least a plurality of drive gears or a plurality of treadle gears, and the plurality of gears are being driven by movement of the plurality of treadles.

24. The vehicle energy harvester of claim 15, wherein the plurality of transient absorption devices are a plurality of torsion springs configured to absorb the transient force acting on the vehicle activated treadle.

25. A vehicle energy harvester comprising:
a subunit having an upper surface forming a roadway surface;
a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
a generator that generates power in response to movement of the vehicle activated treadle from the first position to the second position and from the second position to the first position;
short-duration electrical storage means, coupled to the generator, for storing power generated by the generator;
a torsion spring coupled between a gear and the generator, the torsion spring configured to absorb a transient force acting on the vehicle activated treadle, and
a flywheel coupled between the torsion spring and the generator.

* * * * *